United States Patent [19]

Müller

[11] 4,003,160
[45] Jan. 18, 1977

[54] PROCESS FOR GROWING CHLOROPHYLLOSE PLANTS USING CARBON DIOXIDE AND HEAT GENERATED IN EXOTHERMIC AEROBIC FERMENTATION PROCESSES

[76] Inventor: Hans Müller, Im Almendli, Erlenbach, Zurich, Switzerland

[22] Filed: Feb. 24, 1976

[21] Appl. No.: 661,118

Related U.S. Application Data

[63] Continuation-in-part of Ser. No. 551,348, Feb. 20, 1975, abandoned.

[30] Foreign Application Priority Data

Mar. 14, 1974  Switzerland .................... 3687/74
June 25, 1974  Switzerland .................... 8804/74

[52] U.S. Cl. .................................. 47/58; 47/62;
                                  47/17; 47/1.4; 195/142
[51] Int. Cl.² .................................. A01G 31/02
[58] Field of Search ............... 47/1.4, 1.2, 58, 17;
                                              195/127, 142

[56] References Cited

UNITED STATES PATENTS

| | | | |
|---|---|---|---|
| 2,732,663 | 1/1956 | Dewey | 47/1.4 |
| 3,292,584 | 12/1966 | Brodrick | 47/1.2 X |
| 3,546,812 | 12/1970 | Kobayashi et al. | 47/1.4 |
| 3,577,678 | 5/1971 | Burton | 47/58 |
| 3,698,881 | 10/1972 | White | 47/1.4 X |
| 3,732,089 | 5/1973 | Megronigle | 47/1.4 X |
| 3,768,200 | 10/1973 | Klock | 47/1.4 |
| 3,855,121 | 12/1974 | Gough | 47/1.4 X |
| 3,860,487 | 1/1975 | Emanuel | 47/1.2 X |
| 3,882,635 | 5/1975 | Yamanaka et al. | 47/1.4 |

*Primary Examiner*—Robert E. Bagwill
*Attorney, Agent, or Firm*—Michael J. Striker

[57] ABSTRACT

Processes for growing chlorophyllose plants in greenhouses using carbon dioxide and heat generated in exothermic aerobic fermentation processes in which carbon dioxide is produced.

3 Claims, 1 Drawing Figure

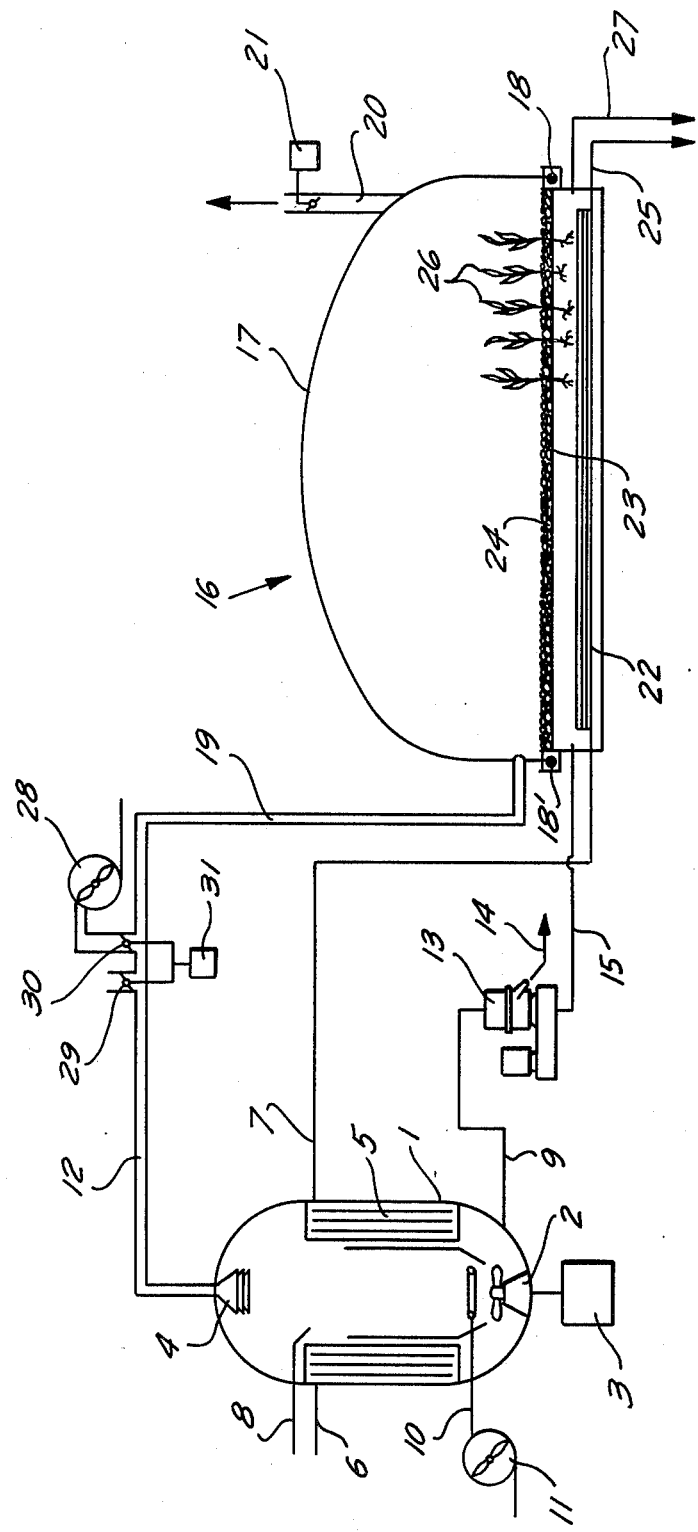

PROCESS FOR GROWING CHLOROPHYLLOSE PLANTS USING CARBON DIOXIDE AND HEAT GENERATED IN EXOTHERMIC AEROBIC FERMENTATION PROCESSES

CROSS-REFERENCE TO RELATED APPLICATION

This application is a continuation in part of my application Ser. No. 551,348, filed Feb. 20, 1975 and now abandoned.

BACKGROUND OF THE INVENTION

The present invention pertains to a process for biologically utilizing carbon dioxide and heat that are generated in exothermic aerobic fermentation processes in which carbon dioxide is formed for the growth of chlorophyllose plants in greenhouses.

It is known that, in exothermic aerobic fermentation processes, especially those used for the production of yeast cells and similar protein-containing products that are to be used for food and fodder by the cultivation of yeasts and other microorganisms, large quantities of carbon dioxide as well as correspondingly large quantities of heat are generated. Dependent upon the medium that is cultured, between 3000 and 10,000 kilogram-calories of heat and a correspondingly large quantity of carbon dioxide are generated for each kilogram of solid material that is produced in most such aerobic fermentation processes. This heat must be withdrawn by cooling means and the carbon dioxide is generally released or vented from the fermentor with the exhaust air. As an example, it might be mentioned that, in a fermentor having a capacity of 200 cubic meters, in which approximately 20,000 kilograms of solid yeast is produced daily for fodder, and in which 300 cubic meters of air are charged per minute, 432,000 cubic meters of exhaust air are vented daily. This exhaust air contains between 2 and 10% by volume of carbon dioxide gas, dependent upon the products being made. This is an enormous amount of carbon dioxide which is normally vented or released to the atmosphere as waste.

On the other hand, likewise dependent upon the product being made, between approximately 60 and 200 million kilogram-calories of heat must be withdrawn daily by the said cooling means. As is known, such yeast, or bacterial or fungal, products are being produced in increasingly greater quantities for use as food and animal fodder by fermentation in this manner. Many times in those regions in which such fermented protein-containing products must be produced, or in which the chlorophyllose vegetational type of food and fodder crops have failed, or at least are available only in inadequate amounts, it would be of great importance to achieve a symbiosis or mutual cooperation between the growth of yeasts in such exothermic aerobic fermentation processes in which carbon dioxide is produced and the cultivation and growth of chlorophyllose plants and vegetation.

SUMMARY OF THE INVENTION

The principal object of the present invention accordingly is to provide a process for the growth of chlorophyllose plants or vegetation in which the otherwise waste byproducts such as carbon dioxide and heat from exothermic aerobic fermentation processes are utilized.

In accordance with the processes of the present invention, this object is achieved by using such carbon dioxide and heat biologically for cultivation of chlorophyllose plants and vegetation in greenhouses.

Whereas protein-producing microorganisms generate carbon dioxide and heat as waste byproducts, large quantities of both these byproducts are required by chlorophyllose plants and vegetation for their growth. Recently chlorophyllose plants and vegetation have been cultivated and grown not only in open fields but have also been grown in greenhouses in accordance with hydroponics procedures that may have been adapted at least in part for continuous operation.

It has now been found that the said byproducts, namely, carbon dioxide and heat, can be supplied for use in the cultivation and growth of chlorophyllose plants and vegetation, as a result of which a considerably greater rate of growth of the plants is achieved. The exhaust gases containing carbon dioxide that are vented from such fermentation processes are supplied through pipes or conduits, to greenhouses. In regions where the atmospheric temperature is not high enough or there is not an adequate supply of heat for cultivation and growth of such plants, the heat that is also generated in such exothermic fermentation processes can be transferred from the cooling means that is connected to the fermentor that is used in the fermentation process to heating means in the greenhouse.

Furthermore, the exhaust gases from the fermentor in which the fermentation process is performed, which gases are still under a slight superatmospheric pressure, may also be used to inflate portable greenhouses made of plastic sheet materials in which such plants are growing. In this manner, energy that would otherwise be wasted is also optimally utilized for inflating and maintaining the slight excess pressure that is required to maintain the plastic greenhouse in an inflated condition, thereby also saving the cost of a separate blower for this purpose. Also a slight superatmospheric pressure of carbon dioxide has a beneficial effect on the growth of plants.

The processes of the present invention are thus a combination of a fermentation process with a process for the growth and cultivation of chlorophyllose plants and vegetation in which the by-products of the fermentation process are used for growth of the plants. The chlorophyllose plants in turn convert the carbon dioxide into oxygen which is required for respiration and growth of the yeasts.

BRIEF DESCRIPTION OF THE DRAWING

The drawing is a schematic representation of a preferred arrangement or plant in which the processes of the present invention may be carried out.

DETAILED DESCRIPTION OF PREFERRED EMBODIMENT OF THE INVENTION

The processes of the present invention are further illustrated in connection with the accompanying drawing which represents a preferred embodiment of the invention that was selected solely for purposes of illustration and consequently is not to be construed as restrictive of the invention.

The plant that is represented in the accompanying drawing consists of a fermentor 1 in the form of a closed tank or kettle that is provided with a stirrer 2 driven by an electric motor 3 and includes a mechanical foam breaker 4 in the form of baffle vanes to provide for the separation of gas from the liquid in the foam that may form during fermentation. The fermentor is also provided with cooling elements or heat exchanger 5 through which a coolant is passed. The coolant is supplied to the cooling elements 5 through a feed pipe 6 and after passing through the cooling element is discharged through discharge pipe 7.

The fermentor 1 is also provided with a pipe 8 for supplying the culture medium or substrate or other nutrients to the fermentor and an outlet pipe 9 is provided for withdrawing the cells of the yeast or other microorganisms that have been grown or cultivated therein.

Compressed air is supplied to the fermenting substrate through the pipe 10 from a compressor or blower 11. The exhaust air or gases are discharged from the fermentor through a pipe 12 that is connected to the mechanical foam breaker 4.

The yeast that is grown in the fermentor is separated from the fermentation brew therein by means of a centrifuge 13 or other suitable apparatus for separating solids from liquids. The fermentation brew is withdrawn from the fermentor through pipe 9 that discharges into the separator 13, from which the concentrated solids in the brew are discharged through an opening 14 and the liquid portion thereof through a pipe 15.

A greenhouse 16 comprising a flexible inflatable plastic shell 17 is fastened to a base by means of clamps 18 and 18' or other means to seal the loose ends of the shell to the base of the greenhouse. A pipe 19 is provided for passing gases into the greenhouse and another pipe 20, to which a gas-pressure controlling device 21 is connected, is supplied for venting or discharging the gases from the greenhouse.

A heat exchanger 22 is installed in the greenhouse below a screen or grating 23 upon which a layer of porous granules 24 are laid. These porous granules 24 may be sand or gravel or any other conventional particulate solid that is used in conventional hydroponics procedures to provide mechanical support for growing plants. The warmed coolant that is discharged from fermentor 1 by means of the pipe 7 is passed through the heat exchanger 22 and is discharged therefrom through pipe 25 and may be recirculated to the fermentor through pipe 6 after having been cooled in a cooling tower that is not shown in the drawing.

Viable seeds or growing seedlings of chlorophyllose plants 26 are planted in the porous granules 24 which are supplied with water through the pipe 15 from the separator 13. This water from the pipe 15, which may contain nutrient salt and growth substances that remained in the fermentation brew after the yeast cells were separated therefrom, is charged into the greenhouse and is spread as a layer below the screen 23. The height of the surface of this water layer is controlled by overflow into pipe 27, the opening of which is located at a height such that at least a portion of the roots of the growing plants 26 are wetted therewith. This overflow water may be reused in the process after suitable treatment or purification.

A blower 28 can be used to supply air to the greenhouse 16 through the pipe 19, the flow of which is controlled by throttle valves 29 and 30, both of which are controlled by an automatic regulator 31.

During the continuous operation of the process for the production of yeast in the fermentor 1, cold water from a cooling tower that is not shown in the drawing, or from another suitable source, is passed into the cooling elements 5 through the pipe 6. The culture medium in the fermentor in which the yeast cells are growing is vigorously aerated and the rate at which the cooled water is passed through the cooling elements or heat exchanger 5 is so controlled that the temperature of the water is raised to between 35° and 38° C. The thus-warmed water in the cooling elements 5 is then passed through pipe 7 into the heat exchanger 22 in the greenhouse 16. The water layer at the bottom of the greenhouse is thereby warmed by interchange with the warm water passing through the heat exchanger 22, which is thereby cooled and is passed directly back into the cooling elements 5 through the pipe 6, or all or a portion thereof is passed through an intermediate cooling tower for further cooling before it is recirculated into the cooling elements 5.

The liquid culture medium that is to be used for growing the yeast is supplied to the fermentor 1 through the pipe 8 and is continuously stirred therein and mixed with the yeast growing therein by means of the stirrer 2 driven by the motor 3 while air is vigorously charged thereinto. The fermented brew is continuously withdrawn from the fermentor through the pipe 9 and is passed through the centrifugal separator 13 where the yeast cells are separated from the liquid portion of the brew. As thus recovered, the dry-solids content of the yeast cells is between 16 and 20% by weight. These yeast cells are then subjected to further conventional treatments.

The water which contains nutrient salts and growth substances that is separated in the separator 13 is then passed into the greenhouse 16 through the pipe 15 to supply water and nutrient materials to the growing plants 26 therein as described hereinbefore. In this manner, the plants will at least be supplied with such nutrients as are present in the water as it passes through the greenhouse 16 before it is discharged therefrom through the pipe 27. The effluent water is purified to such an extent that it can be reused as dilution water for the culture medium that is being used in the fermentation process. It can however also be subjected to further purification in a biological clarification plant before reuse.

The air that is required for the growth of the yeast is charged through the fermentor 1 through the pipe 10. In the fermentation process, the growing yeast cells convert a portion of the oxygen of the air to carbon dioxide by respiration. After the foam is broken by the foam breaker 4 the air to which carbon dioxide has thus been added is passed into the greenhouse 16 through the interconnected pipes 12 and 19. By means of a suitable device 29, the humidity and the carbon dioxide content of the air is determined and controlled by means of a blower 28 that is actuated by suitable regulators. The pressure of the atmosphere in the greenhouse 16 is measured and controlled by the gas-pressure controlling device 21 which actuates the throttle valve in the gas release pipe 20.

EXAMPLE

In this example, yeast of the species *Saccharomyces fragilis* was cultivated at a temperature of 40° C in a fermentor having a useful volume of 500,000 liters on a conventional carbohydrate medium to produce 8 grams per liter per hour of yeast cells. The total hourly output of this fermentor is accordingly 4000 kilograms of yeast cells during which period $14 \times 10^6$ kilogram-calories of heat are also produced.

Based upon the following stoichiometrical equation, and based upon aeration with air at a space velocity of one volume per volume minute, the following material balance is computed:

$$1.71\ CH_2O + 0.19\ NH_3 + 0.6775\ O_2 + \text{minerals} \longrightarrow$$
$$51.3 \qquad 3.23 \qquad 21.68$$

$$1.0\ Ash(CH_{1.7}O_{0.5}N_{0.19}) + 0.71\ CO_2 + 1.145\ H_2O + 80{,}000\ \text{kilogram-calories}$$
$$24.36 \qquad\qquad 31.24 \qquad 20.61$$

The amount of carbon dioxide that is produced hourly is equivalent to 5130 kilograms. For this purpose, the amount of oxygen that is consumed is 40% which amounts to 30,000 cubic meters at normal temperature and pressure, namely 23,700 cubic meters $N_2 = 78.67\%$
3,780 cubic meters $O_2 = 12.56\%$
2,612 cubic meters $CO_2 = 8.68\%$ Taking into consideration the general equation for the photosynthetic formation of carbohydrates, the following material balance was obtained:

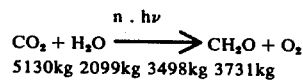
$$CO_2 + H_2O \xrightarrow{n \cdot h\nu} CH_2O + O_2$$
$$5130kg\ 2099kg \quad 3498kg\ 3731kg$$

Assuming that the assimilation of carbon dioxide increases directly with the carbon dioxide concentration under favorable conditions of temperature, humidity and, above all, illumination (approximately 6,000 lux), a greenhouse having the following dimensions is required.

By enrichment of the air in the greenhouse from a concentration of 0.03% to 0.06% by volume of carbon dioxide and by an uptake of 2 grams of carbon dioxide per square meter of leaf surface per hour the available carbon dioxide is sufficient for utilization by 3,500,000 square meters of leaf surface, assuming an efficiency of 66%, that is, a reduction of the carbon dioxide concentration from 0.06% to 0.02% by volume.

To achieve a production of 1.6 metric tons of tomatoes per hectare per day, in accordance with the processes of the present invention, a greenhouse having a growing area of 130 hectares is required. A maximum daily yield of only 1.2 metric tons of tomatoes per hectare is normally obtained in conventional greenhouses of this size. The vegetative period of tomato plants, that is, the period from planting until productive growth ceases, is about 120 days. The ripened pulpy berry or fruit of the plant can however only be harvested during about 60 days of this vegetative period. It is possible to have a total of 3 vegetation periods per year with a total harvest period of 180 days, assuming that the plant is built in a region where the required illumination for growth is available throughout the entire year. The total annual production of tomatoes from such a plant would accordingly be $360 \times 130 \times 1.6$ or 74,880 metric tons.

Such a plant would have to have a volume of 3,900,000 cubic meters. Since air has a specific heat of approximately 0.3 kilogram-calorie per cubic meter per centigrade degree, the temperature of the air in the greenhouse would be raised to a maximum of 11° C with 14 million kilogram-calories that are hourly available during the night and perhaps during the cool season.

Although the process of the present invention is adapted to the use of carbon dioxide and heat produced by any process for the cultivation of yeast in which carbon dioxide and heat are generated, it is particularly adapted to the cultivation of yeasts of the genera *Saccharomyces fragilis*, *Saccharomyces flava lactis*, *Saccharomyces kefir*, and *Saccharomyces lactis*.

Any conventional nutrient medium that is suitable for cultivation of the said yeasts may be used. Whey from cheese factories is a particularly suitable medium for this purpose.

The cultivation of the yeasts may also be conducted in conventional manner, for example, such as is described in U.S. Pat. No. 2,809,113.

The process of the present invention is particularly adapted to the growth of tomatoes and similar chlorophyllose plants which are generally grown in greenhouses in accordance with conventional hydroponics procedures, that is, growing in nutrient solutions with or without sand, gravel, or other inert medium to provide mechanical support therefor. Although the nutrient solution that is obtained after separation of the yeast cells from the liquid portion of the fermentation brew in which the yeast cells were grown was used in the foregoing example, other nutrient solutions can be used for this purpose. For example, the liquid portion of the fermentation brew that is obtained after the yeast cells have been separated therefrom that is further fortified with other nutrients that are required for the growth of the selected plants which may be lacking in the original liquid may be used for this purpose.

The beds in which the plants are grown and the nutrient solution that are used may be any that are conventionally used for the growing of the selected plants in conventional hydroponics processes.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

I claim:

1. A continuous process for growing chlorophyllose plants or vegetation in a greenhouse which comprises
    a. aerobically cultivating a yeast in a nutrient medium in a fermentor,
    b. continuously controlling the temperature of the nutrient medium in the said fermentor during the fermentation by heat exchange with a coolang passing through a heat exchanger in contact with the nutrient medium in the said fermentor,
    c. continuously passing the effluent coolant from the said heat exchanger to a second heat exchanger that is located in the greenhouse below the surface of a layer of liquid that is located below a bed of chlorophyllous plants that are growing in the said greenhouse, d. continuously passing the nutrient medium in which the yeast cells have been grown from the fermentor into a separator, e. separating the yeast cells from the liquid portion of the nutrient medium in which the yeast cells have been grown in the said separator and recovering the said yeast cells, f. continuously passing the said liquid portion of the nutrient medium from which the yeast cells have been separated into and through the greenhouse below the bed of chlorophyllous plants that are growing in the said greenhouse and into contact at least with roots of the plants growing in the said bed, g. continuously passing the carbon dioxide that is generated during the cultivation of the yeast from the fermentor into the atmosphere of the greenhouse, and h. harvesting the plants that have been grown in the said bed in the said greenhouse.

2. A process as defined in claim 1 in which the yeast that is cultivated in the fermentor is *Saccharomyces fragilis*.

3. A process as defined in claim 1 in which the nutrient medium in which the yeast is grown is whey.

* * * * *